Oct. 11, 1949.    J. H. STARR    2,484,759
POWER LIFT CONNECTION
Filed July 16, 1945

INVENTOR.
JOHN H. STARR
BY
ATTORNEYS

Patented Oct. 11, 1949

2,484,759

UNITED STATES PATENT OFFICE 2,484,759

POWER LIFT CONNECTION

John H. Starr, Mayville, Wis., assignor to John Deere Van Brunt Company, a corporation of Wisconsin Application July 16, 1945, Serial No. 605,345

4 Claims. (Cl. 287—100)

1

The present invention relates generally to agricultural implements and more particularly to power operated mechanism for operating, or raising or lowering, the tools or other parts of the implement.

The object and general nature of the present invention is the provision of a new and improved means for attaching the power cylinder of a hydraulic power lift device to the implement so as to make it convenient to readily attach and detach the hydraulic unit from the implement so that the hydraulic unit, which is generally in the form of a jack or ram, may remain in operative connection with the tractor which ordinarily propels the implement. Further, it is a feature of this invention to provide a new and improved quick detachable device by which the attachment and detachment of the cylinder unit may readily be accomplished but without any danger of the parts becoming disconnected or loosened during operation of the implement so as to render the power lift thereof defective or unreliable. Further, it is a feature of this invention to provide means whereby the operating handle of the attaching mechanism is utilized for retaining the mechanism in locked relation.

These and other objects and advantages of the present invention will be apparent to those skilled in the art after a consideration of the following detailed description, taken in conjunction with the accompanying drawings in which one preferred embodiment of the invention has been illustrated.

Figure 1:
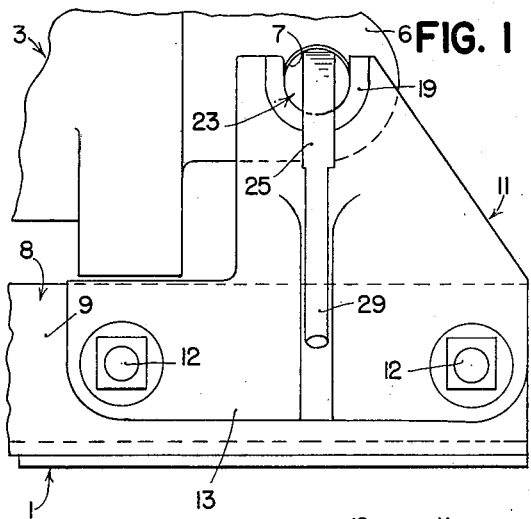
Figure 1 is a fragmentary side view of a portion of an agricultural implement having power lift mechanism for raising or lowering the tools with new and improved releasable connecting mechanism for the power lift unit, constructed and arranged according to the principles of the present invention.
Figure 2:
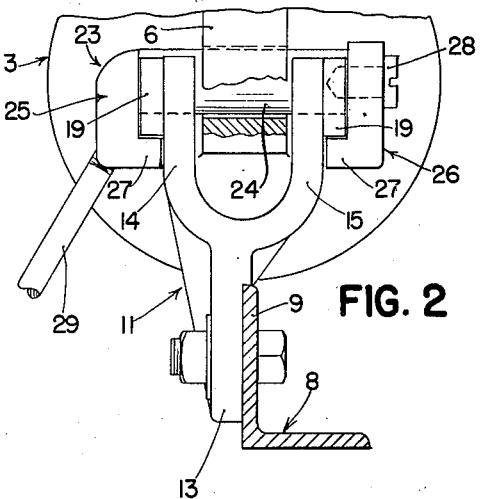
Figure 2 is an end view of the device shown in Figure 1.
Figure 3:
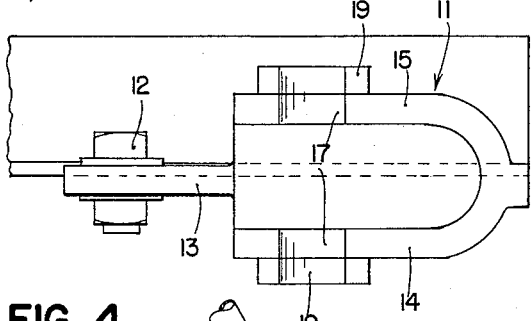
Figure 3 is a top view of the implement attaching bracket with the power lift unit removed.

Referring now to the drawings, particularly Figures 1–3, the agricultural implement in which the present invention has been incorporated is indicated in its entirety by the reference numeral 1 and for purposes of illustration has been shown as a field cultivator which includes a hitch frame upon which a hydraulic ram in the form of

2 a piston and cylinder unit 3 is normally adapted to be mounted for raising and lowering the tools by power derived from the tractor to which the implement is connected. Normally the hydraulic power unit 3 is connected with suitable hydraulic power operated mechanism (not shown) on the tractor, being connected therewith through one or two hose lines 4, the unit 3 being in the present form a double acting device. Since the unit 3 is normally connected as a permanent part of the tractor, whenever the implement 1 is to be disconnected from the tractor it is also necessary to disconnect the unit 3 from the implement. The means by which the unit 3 may readily be connected to and disconnected from the implement forms the principal part of the present invention and will now be described.

An apertured ear 6 forms a part at the front end of the cylinder device 3, the aperture therein being indicated by the reference numeral 7. The hitch frame includes an angle 8 to the vertical flange 9 of which an attaching bracket 11 is bolted, as at 12. The attaching bracket 11 is preferably in the form of a yoke or bifurcated member, having an elongated attaching base section 13 and a pair of arms 14 and 15 arranged in laterally spaced apart relation, as best shown in Figures 2 and 3. The upper end of each of the arms 14 and 15 is provided with a notch or opening 17, which is open at the top, and an arcuate lip or lug 19 is secured to the arms 14 and 15 around the outer edge of the associated opening 17.

A locking pin 23 is, in this form of the invention, carried in the opening 7 of the cylinder lug 6. The locking pin 23 comprises a central cylindrical section 24 and a pair of lugs 25 and 26 fixed to the central section 24 at each end thereof. Preferably, each of the lugs 25 and 26 is formed generally as an L-shaped member, each having a laterally inwardly extending locking lip or lug section 27 spaced radially from the associated end of the cylindrical pin section 24. The lug member 25 may be welded to or formed integrally with the section 24, or secured permanently thereto in any suitable manner. Preferably, however, the other lug member 26 is detachably connected with the outer end of the pin 23, in order to provide for the initial insertion of the pin 23 into the opening in the cylinder lug 6. After insertion, the lug member 26 may be attached to the pin 23 by any suitable means, such as a cap screw 28 (Figure 2). An operating handle 29 is fixed, as by welding, to the pin 23, preferably to the interlocking lug 25 thereof. The pin member 23 is rockably or rotatably mounted in the cylinder lug 6.

In operation, the cylinder unit 3 may readily be connected to the bracket 11 merely by turning the handle 29 into a position to dispose the locking lips or lugs 27 in upper position. The pin 23 may then be placed in the openings 17 with the cylinder ear or lug 6 in between the two side arms 14 and 15 of the bracket 11. After the cylindrical portion of the pin 23 is seated in the notches 17, the handle 29 is then turned downwardly into the position shown in Figure 1. This causes the lips 27 or lugs to be swung around the arcuate lips or lugs 19 on the bracket, and thus interlocking the parts and holding the cylinder connected with the bracket, as best shown in Figure 2. While I have not shown the other end of the hydraulic unit 3, the end shown being the cylinder end of the device, it will be understood that the piston end of the device may be likewise connected to the implement or may be connected thereto by any other type of quick detachable connection. The cylinder 3 may be released from the bracket 11 merely by swinging the handle 29 upwardly to release or disconnect the lips or lugs 27 from the lips or lugs 19, whereupon the cylinder may merely be lifted from the bracket 11.

Figure 6:
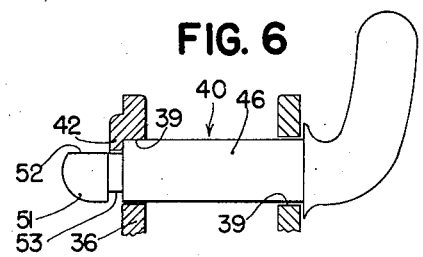
Figure 6 is a sectional view showing the locking pin turned into a position facilitating the insertion of the pin in the bracket for connecting the hydraulic cylinder thereto.
Figure 4:
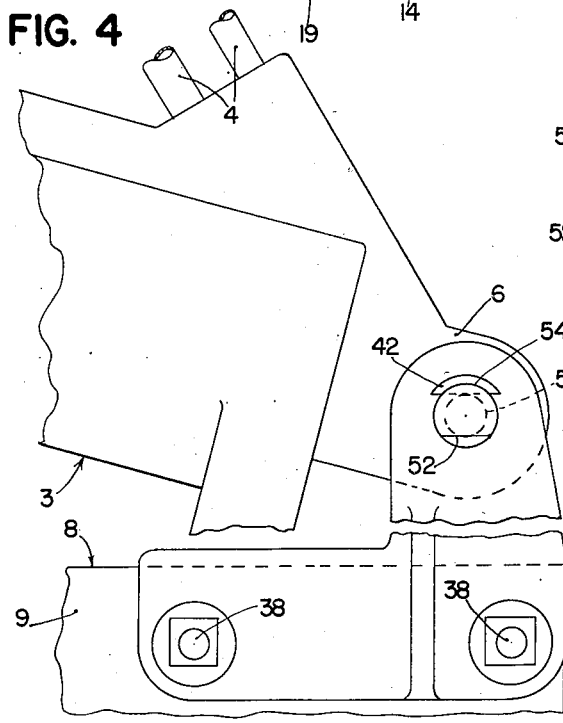
Figure 4 is a view similar to Figure 1, showing a modified form of the present invention.
Figure 5:
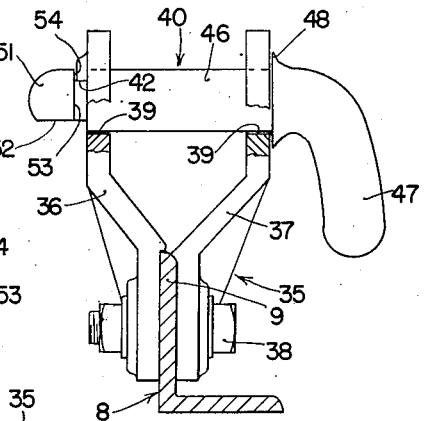
Figure 5 is an end view of the device shown in Figure 4.

A modified form of the present invention is shown in Figures 4–6, and referring now to these figures, it will be seen that the same cylinder unit 3 is shown as a power operated unit that is to be detachably connected there with the implement. In this form of the invention, the frame of the implement carries an attaching bracket 35 which preferably comprises a pair of arm sections 36 and 37 which are separate parts but which are secured to the vertical flange 9 of the angle 8 by any suitable means, such as a pair of bolts 38. Each of the arm sections 36 and 37 is provided with an opening 39 therethrough to receive a turnable locking pin indicated in its entirety by the reference numeral 40. In this form of the invention the locking pin 40 is insertable into and removable from the opening 7 in the cylinder lug 6. The arm 36 of the bracket 35 is provided with a laterally outwardly disposed locking lip or lug 42 which extends at least partially over or across the associated opening 39.

The locking pin 40 in this form of the invention includes a generally cylindrical central section 46, which at one end is formed with a handle 47 and a limit flange 48. At the other end the pin 40 is rounded, as at 51, and flattened, as at 52, the flattened portion extending from the rounded end 51 back to an annular groove 53. The flattened section 52 is so formed with respect to the handle 47 that when the latter is turned into an upper position (Figure 6) the pin 40 may be inserted through the openings 39, and also through the opening 7 in the cylinder lug 6 that at this time is disposed between the arms 36 and 37, the flattened section 52 passing underneath the locking lip or lug 42. The groove 53 and the end portion 51 of the pin 40, as best shown in Figure 5, forms a cooperating locking lip or lug 54 (Figure 5) which, when the handle 47 is turned from the position shown in Figure 6 to the position shown in Figure 5, cooperates with the lug 42 to retain the locking pin 40 in position. It will be seen that the weight of the handle 47 acts to retain the locking lugs or lips 42 and 54 in interlocked position, yet by turning the handle through approximately 180 degrees, the pin 40 will be in a position in which it may readily be pulled away from the bracket and cylinder and permitting the latter to be lifted away from the implement.

While I have shown and described above, the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, a cylinder-receiving bracket having an open slot therein, a power lift cylinder having an apertured lug, a pin turnably carried permanently in the aperture in said lug and adapted to be placed in said slot while carried by said lug, and interengaging means on said pin and bracket for interlocking said pin and bracket so as to hold said pin in said slot, thereby holding said cylinder connected to said bracket.

2. In a detachable power lift unit for agricultural implements and the like, a part having an apertured lug, a pin turnably mounted therein, a locking member fixed to each end of said pin, and serving thereby to normally permanently retain said pin in said apertured lug, a bracket to which said power lift unit is adapted to be connected, said bracket having an open slot to receive said pin, and abutment means on said bracket adjacent the closed portion of said slot and adapted to interlock with said locking members on the pin when the pin is turned to a given position for holding said pin in said slot, thereby locking said power lift unit to said bracket.

3. In a detachable power lift unit for agricultural implements and the like, a part having an apertured lug, a pin turnably mounted therein, a locking member fixed to each end of said pin, and serving thereby to normally permanently retain said pin in said apertured lug, a bracket to which said power lift unit is adapted to be connected, said bracket comprising a generally U-shaped member having a pair of spaced apart side portions, each of which is provided with an open slot to receive the end portions of said pin, and abutment means on each of said side portions positioned thereon so that when the pin is turned in said lug to a given position said locking members interlock with said abutment means for holding the pin in said open slots, thereby locking said power lift unit to said bracket.

4. For use in an agricultural implement having a power lift cylinder with an apertured lug, the improvement comprising a cylinder-receiving bracket having an open slot therein, a pin adapted to be turnably carried permanently in the aperture in said lug and adapted to be placed in said slot while carried by said lug, and interengaging means on said pin and bracket for interlocking said pin and bracket so as to hold said pin in said slot, thereby holding said cylinder connected to said bracket.

JOHN H. STARR.

REFERENCES CITED

The following references are of record in the file of this patent:

UNITED STATES PATENTS

| Number | Name | Date |
| --- | --- | --- |
| 1,222,997 | Rottmer | Apr. 17, 1917 |
| 2,259,880 | Ehmann | Oct. 21, 1941 |
| 2,332,561 | Drott | Oct. 26, 1943 |